United States Patent [19]
Stempel

[11] 3,765,634
[45] Oct. 16, 1973

[54] JOINER SUPPORT
[75] Inventor: Edward H. Stempel, Pompano Beach, Fla.
[73] Assignee: Belaco, Inc., Ocala, Fla.
[22] Filed: May 25, 1971
[21] Appl. No.: 146,652

[52] U.S. Cl. .................................. 248/250, 287/49
[51] Int. Cl. ........................................ A47b 3/00
[58] Field of Search ................... 211/106, 148, 181, 211/182; 108/152; 248/240.4, 240.2, 240, 250; 287/49

[56] References Cited
UNITED STATES PATENTS

| 469,808 | 3/1892 | Poindexter | 287/49 |
| 1,695,211 | 12/1928 | Shilander | 211/90 X |
| 3,300,784 | 1/1967 | Ervine | 287/49 X |
| 2,894,643 | 7/1959 | Maslow | 211/182 X |
| 3,598,064 | 8/1971 | Stempel | 211/90 X |
| 1,596,812 | 8/1926 | Curtis et al. | 211/90 X |

FOREIGN PATENTS OR APPLICATIONS

| 1,287,983 | 4/1960 | France | 211/182 |

*Primary Examiner*—J. Franklin Foss
*Attorney*—Settle & Oltman

[57] ABSTRACT

A joiner support for joining together open shelves by fastening together two shell halves about rods of the shelves, the rods extending through openings in the shell halves and being braced within the shell halves to help stabilize the shelves. The joiner support can be braced against a wall with a bracket.

6 Claims, 4 Drawing Figures

PATENTED OCT 16 1973
3,765,634
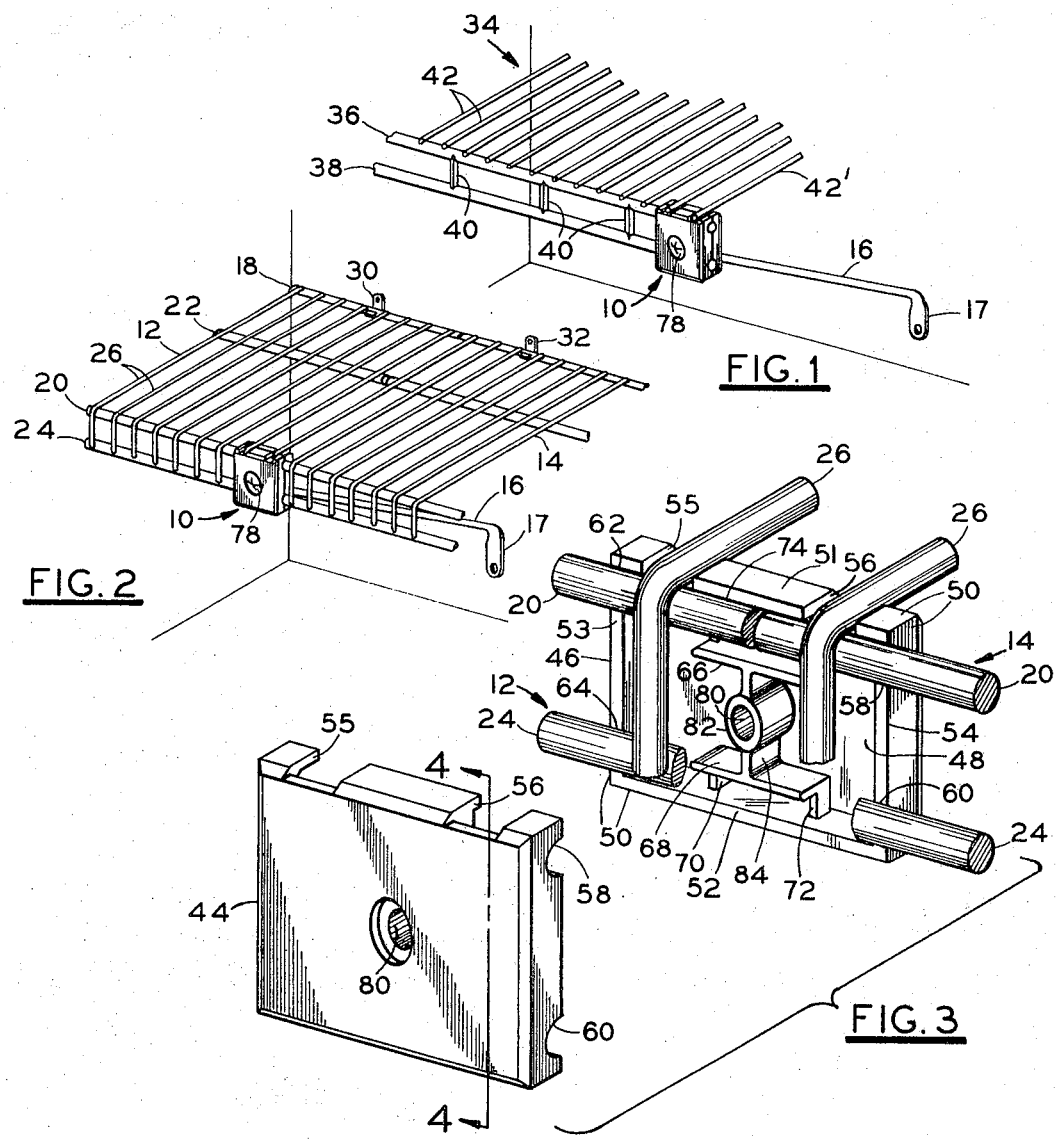
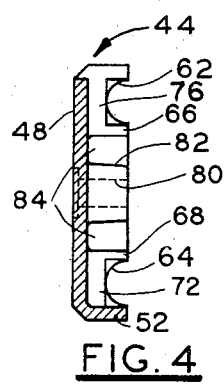
INVENTOR.
EDWARD H. STEMPEL.
BY
SETTLE & OLTMAN.

JOINER SUPPORT

BACKGROUND OF THE INVENTION

Joiner devices for open shelves have usually involved many separate pieces which must be fastened together when the shelves are installed. The installation of open shelves with known joining devices has involved too much labor, and the joining devices themselves have been unduly costly.

SUMMARY OF THE INVENTION

The invention provides a joiner support which not only joins together two shelves at a front portion of the shelves, but also can be braced against a wall to help support the shelves. The joiner support includes two shell halves each of which has a squared plate portion with a lip at the perimeter of the plate portion projecting perpendicularly thereto, a pair of slots in a first portion of the lip, and a pair of recesses in each of the lip portions which connect to the first lip portion. Thus, the shell halves may be fastened together about the front rods of the shelves with the rods extending through the recesses and with stringers of the shelves which are perpendicular to the rods extending through the slots. The ends of the rods inside the shell halves may be braced by projections formed integrally with the shell halves. These projections preferably include partitions and bridges between which the ends of the shelf rods are trapped.

Accordingly, it is an object of the present invention to provide a joiner support which not only joins shelves together but which also helps to stabilize the shelves.

Another object of the invention is to provide a joiner support which may be made of molded plastic material.

Another object of the invention is to minimize the number of pieces in the joiner support.

A further object of the invention is to brace shelf rods within the joiner support to help stabilize the shelves.

Still another object of the invention is to brace the entire joiner support with a bracket to help support the shelves.

Other objects of this invention will appear from the following description and appended claims, reference being had to the accompanying drawings forming a part of this specification wherein like reference characters designate corresponding parts in the several views.

BRIEF DESCRIPTION OF THE DRAWINGS

FIG. 1 is a perspective view of a shelf mounted in a corner of a room and supported with a joiner support in accordance with one embodiment of the invention;

FIG. 2 is a perspective view of two shelves joined together by the joiner support;

FIG. 3 is an exploded view in perspective, with parts broken away for clarity, showing how the two shell halves of the joiner support clamp around rods of the shelf; and FIG. 4 is a sectional view taken along line 4—4 of FIG. 3.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

DETAILED DESCRIPTION

FIGS. 1 and 2 show two different types of shelves supported by the same joiner support 10. In FIG. 2, two shelves 12 and 14 are joined together at front portions of the shelves by the joiner support 10. The joiner support 10 is braced against a wall by a bracket 16 to help support the shelves. The shelves 12 and 14 are open shelves consisting of rods and stringers. In shelf 12, for example, there is a rear rod 18, a front rod 20 and a middle rod 22. These rods are all parallel to each other and lie in the same plane. At the front of the shelf, there is another rod 24 which is parallel to rod 20, and rods 20 and 24 lie in a plane which is perpendicular to the first plane. There are stringers 26 running perpendicular to all of the rods and affixed thereto as by welding. It may be noted that the stringers bend over rod 20 and extend down to rod 24. The other shelf 14 is of the same construction.

The shelves 12 and 14 are supported at the rear by hooks 30 and 32, and they are supported at the front by the support 10 together with the bracket 16. There may be additional wall brackets for supporting the ends of the shelves.

In FIG. 1, a shelf 34 is shown which is slightly different in construction. Only a portion of the shelf is shown since the remainder of the shelf is the same as shelves 12 and 14. The shelf 34 has front rods 36 and 38 of a heavier gauge so that hangers may be hung on the rod 38. There are heavier spacers 40 joining the two rods 36 and 38 and keeping them at the proper spacing. It may be noted that the stringers 42 terminate at the rod 36 and do not bend down to join rod 38 as do the stringers 26 in FIG. 2.

The joiner support 10 in FIG. 1 is identical to the support 10 in FIG. 2, and the wall bracket 16 is also the same. In FIG. 1, only a single shelf 34 is visible, but it will be understood that stringer 42' is the first stringer of another shelf which is joined to the shelf 34 by the joiner support 10.

The manner in which two shelves are joined together by the joiner support is shown in FIG. 3. The construction of the joiner support will also be described with reference to FIGS. 3 and 4.

The joiner support 10 consists of two shell halves 44 and 46 each of which is made of molded plastic material. The shell halves 44 and 46 shown in the drawings are identical to each other and this is the preferred construction. Since the shell halves are identical, the shell half 46 will be described in detail, and it will be understood that the other shell half 44 is the same.

Shell half 46 consists of a squared, flat plate portion 48 with a peripheral lip 50 projecting laterally perpendiculat to the plate portion 48. perpendicular lip 50 as viewed in FIG. 3 consists of a top lip portion 51, a bottom lip portion 52, a left lip portion 53 and a right lip portion 54. Lip portions 51 and 52 are parallel to each other and lip portions 53 and 54 are also parallel to each other.

Lip portion 51 has two slots 55 and 56 extending across the entire width, and these slots snugly receive the stringers 26 (or stringers 42 in the embodiment of FIG. 1). These slots are also visible in the top lip of shell half 44. Thus, the stringers of the shelf are locked by the top lip.

Lip portion 54 has two semi-circular recesses 58 and 60. These two recesses are also visible at the near end of shell half 44. Lip portion 53 has two identical recesses 62 and 64. Recesses 58 and 60 receive rods 20 and 24 of shelf 14, and recesses 62 and 64 receive rods 20 and 24 of the shelf 12. Since there are identical recesses in both shell halves 44 and 46, the rods are clamped firmly between the two shell halves and retained in the recesses.

The rods 20 and 24 extend through the recesses into the interior of the joiner support and terminate at about the middle of the joiner support. The ends of the two rods 20 terminate between upper lip portion 51 and a partition 66 which is parallel to lip portion 51. The other two rods 24 terminate between lip portion 52 and a partition 68 which is parallel to lip portion 52. Two bridges 70 and 72 extend between lip portion 52 and partition 68, and the rods 24 rest on these bridges. Two identical bridges 74 and 76 (76 not visible) extend between lip portion 51 and partition 66, and the ends of rods 20 rest on these bridges. The partitions and bridges trap the ends of the rods 20 and 24 so that they cannot easily move, thus helping to stabilize the shelves. The shelves are held firmly in place by the shell halves when they are fastened together.

The fastening together of the shell halves is accomplished by a bolt 78 which extends through an opening 80 in a boss 82 projecting from the center of the plate portion 48. The boss 82 may be connected to the partitions 66 and 68 by webs 84. The webs brace the partitions 66 and 68.

The bracket 16, which braces the joiner support 10, is a metal rod having flattened tips 17 at each end thereof, the tips 17 having openings therein through which screws may pass to fasten the bracket to both the joiner support 10 and to the wall. The bolt 78 is used to fasten the bracket to the joiner support.

It may be seen that the joiner support consists of only two plastic pieces, with the lips, the partitions, the bridges, the boss and the webs all being integrally molded with each shell half. Since the shell halves are identical, they may be used interchangeably. The joiner support is braced from a wall with a simple bracket and thus the device serves not only to join two shelves together, but also to help support those shelves. The portions of the shelves which are joined together terminate inside the shell halves and are braced there by projections. It may be noted that the stringers 26 extend down inside the shell halves. However, the stringers 42 in FIG. 1 terminate at the top of the joiner support and do not extend down inside the shell halves. The stringers 42 are still received in the slots 55 and 56 to help lock the shelves in place.

Having thus described my invention, I claim:

1. A joiner support for joining end-to-end two horizontal shelves which have vertically spaced, round, upper and lower end rods, said joiner support comprising:

front and back shells, each having a vertically disposed plate, top and bottom horizontal peripheral lips and vertical peripheral lips at opposite ends of the plate, said top, bottom and end lips on each shell projecting inwardly the same amount substantially perpendicular to the plate and abutting against the corresponding lips on the other shell to define a chamber between the two shells;

each of said shells having aligned upper and lower semi-circular recesses in its opposite end lips, the upper recesses being disposed just below and substantially tangent to a projection of the respective top lip at the latter's inner edge, the lower recesses being disposed just above and substantially tangent to a projection of the respective bottom lip at the latter's inner edge, each of said recesses being spaced inward from the respective plate, the upper semi-circular recesses in the two shells registering with each other at both end lips to define respective upper circular openings for snugly receiving the upper end rods of the shelves to be joined, the lower semi-circular recesses in the two shells registering with each other at both end lips to define respective lower circular openings for snugly receiving the lower end rods of the shelves to be joined;

each shell having an upper, horizontal partition projecting inward from the plate the same amount as the peripheral lips thereon at a location laterally inward from the end lips and spaced below the top lip by substantially the diameter of said upper semi-circular recesses in the end lips, so that said upper end rods of the shelves to be joined are both snugly engaged from above and below by said top lip and said upper partition in laterally spaced relationship to their snug engagement in the upper circular openings at the abutting end lips on the shells;

each shell having a lower horizontal partition projecting inward from the plate the same amount as said peripheral lips thereon at a location laterally inward from the end lips and spaced above the bottom lip by substantially the diameter of said lower semi-circular recesses in the end lips, so that said lower end rods of the shelves to be joined are both snugly engaged from above and below by said lower partition and said bottom lip in laterally spaced relationship to their snug engagement at the lower circular openings at the abutting end lips on the shells;

and means spaced from said recesses and said partitions for releasably clamping said front and back shells together with the peripheral lips of one abutting against the peripheral lips of the other and with the upper and lower partitions of one abutting respectively against the upper and lower partitions of the other.

2. A joiner support according to claim 2, wherein each shell has;

two laterally spaced upper bridges which are spaced laterally inward from the opposite end lips on said shell and which extend down from the top lip to the upper horizontal partition at the inside of the plate, each upper bridge terminating in an inner edge that is spaced inward from the plate the same amount as the edge of the semi-circular upper recess in the nearer end lip on said shell at its horizontal radius, so as to engage the upper end rod of the respective shelf in laterally spaced relationship to its snug engagement in the upper circular openings at the abutting end lips on the shells;

and two laterally spaced lower bridges which are spaced laterally inward from the opposite end lips on said shell and which extend up from the bottom lip to the lower horizontal partition at the inside of the plate, each lower bridge terminating in an inner edge that is spaced inward from the plate the same amount as the edge of the semi-circular lower recess in the nearer end lip on said shell at its horizontal radius, so as to snugly engage the lower end rod of the respective shelf in laterally spaced relationship to its snug engagement in the lower circular openings at the abutting end lips on the shells.

3. A joiner support according to claim 2, wherein said front and back shells have aligned openings in the top for snugly passing the front ends of downwardly-bent end stringers on the respective shelves into said chamber between the shells.

4. A joiner support according to claim 2, wherein each shell has an annular boss located between its upper and lower partitions and projecting inward from the plate the same amount as said peripheral lips and partitions, the plate of at least one of said shells has an opening leading into the interior of said boss, and said bosses on the shells abut against each other.

5. A joiner support according to claim 4, and further comprising vertical ribs on each shell at the inside of the plate connecting the boss to said upper and lower partitions, respectively.

6. A joiner support according to claim 5, wherein said front and back shells have aligned openings in the top for snugly passing the front ends of downwardly-bent end stringers on the respective shelves into said chamber between the shells.

* * * * *

UNITED STATES PATENT OFFICE
CERTIFICATE OF CORRECTION

Patent No. 3,765,634　　　　　　Dated October 16, 1973

Inventor(s) EDWARD H. STEMPEL

It is certified that error appears in the above-identified patent and that said Letters Patent are hereby corrected as shown below:

Column 4, line 48, "claim 2" should read -- claim 1 --.

Signed and sealed this 12th day of November 1974.

(SEAL)
Attest:

McCOY M. GIBSON JR.　　　　　　C. MARSHALL DANN
Attesting Officer　　　　　　　Commissioner of Patents